United States Patent

Branick

[15] 3,683,981

[45] Aug. 15, 1972

[54] PNEUMATIC TIRE CHUCK

[72] Inventor: Charles Earl Branick, 1601 S. 9th St., Fargo, N. Dak. 58102

[22] Filed: July 9, 1970

[21] Appl. No.: 53,397

[52] U.S. Cl. ..............................144/288 A, 18/2 TP
[51] Int. Cl. .............................................B25h 5/00
[58] Field of Search....... 144/288 A; 18/18 F, 2 TM, 2 TP, 18/2 TT, 17 W

[56] References Cited

UNITED STATES PATENTS

| | | | |
|---|---|---|---|
| 3,080,899 | 3/1963 | Robertson | 144/288 A |
| 3,331,412 | 7/1967 | Sornsen | 144/288 A |
| 3,214,791 | 11/1965 | Ericson et al. | 18/2 TP |
| 2,745,137 | 5/1956 | Glynn | 18/18 F |
| 3,258,044 | 6/1966 | Miller | 144/288 A |

*Primary Examiner*—Donald R. Schran
*Assistant Examiner*—James F. Coan
*Attorney*—Duane C. Burton

[57] ABSTRACT

A two-part axially separable chuck for pneumatic tires characterized by a valve system and lock which prevents separation of its parts while a mounted tire thereon is inflated under air pressure. A normally closed safety valve is disposed downstream from a main air supply and exhaust valve which cannot be opened until after the parts are manually lacked against separation. After being locked against separation, the parts cannot be manually unlocked until after the tire is deflated by opening the exhaust valve. The main valve system may be in the form of a conventional two position supply and exhaust valve with a single actuator or both the supply and exhaust valves may be operated by separate valve actuators. The safety valve is spring loaded to closed position and is manually moved to open position shortly after locking of the parts occurs. A single operating lever controls movement of the lock and opening of the safety valve. Resilient adapter rings are also employed to accommodate tires of various bead diameters and an adjustment is provided for tires of various widths between the beads.

13 Claims, 3 Drawing Figures

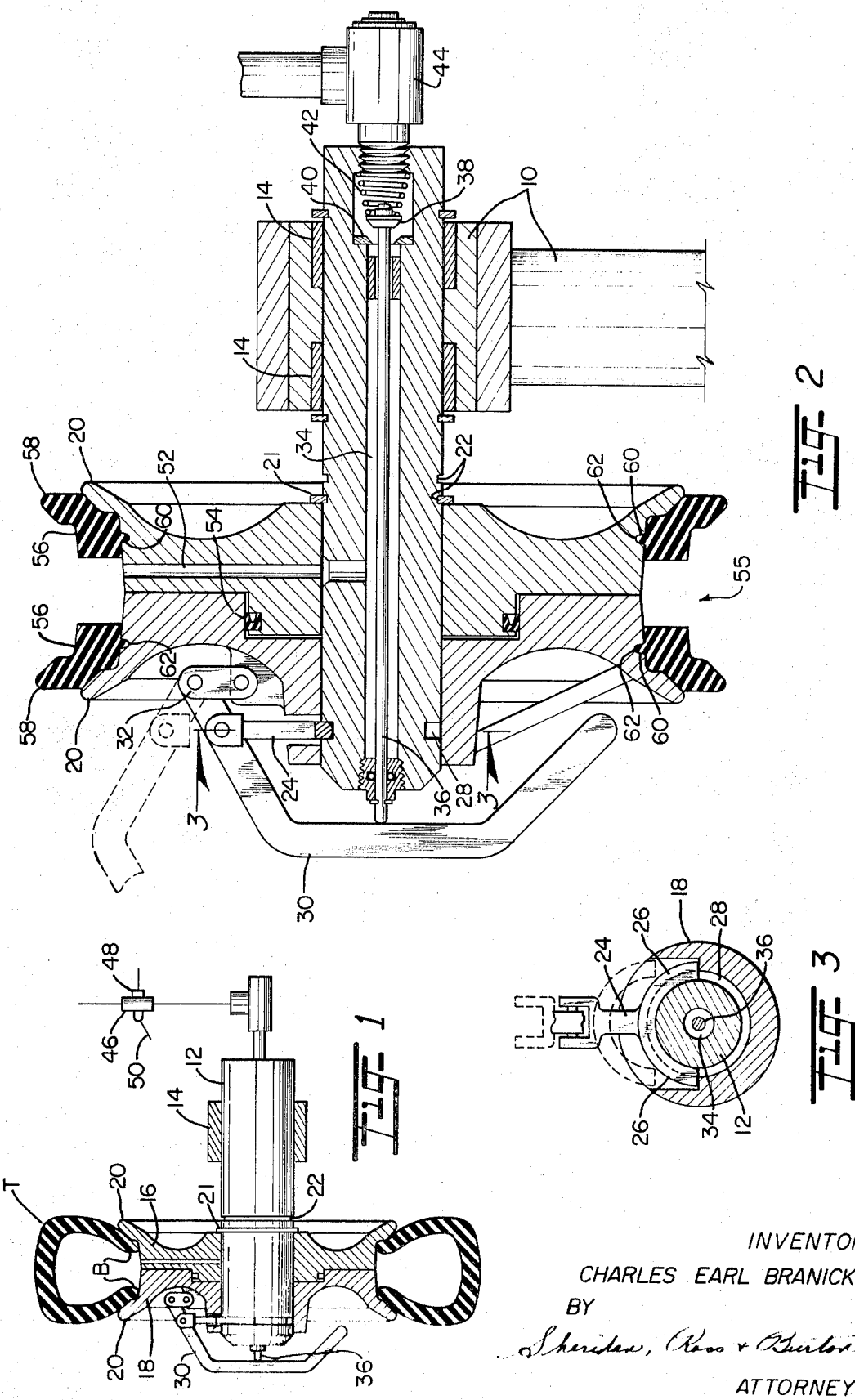

PNEUMATIC TIRE CHUCK

BACKGROUND OF THE INVENTION

In the process of re-building pneumatic vehicle tires it is common practice to mount a tire on a rotatable support or chuck, inflate the tire, rotate the assembly adjacent a processing station, deflate the tire, and finally remove it from the chuck. The processing station may vary, which may, for example, be an initial tread removing station at which the tread is removed by a rotating buffing wheel and the tire periphery conditioned to a desired surface which is concentric with the axis of rotation of the support, as exemplified by U. S. Pat. No. 3,080,899 to Robertson. At a subsequent station the tire may again be mounted in like manner and tread material applied to its periphery which is then stitched to the tire carcass, preparatory to placing it in a suitable mound in which the tread material is vulcanized and bonded to the tire carcass. Patent application of Millard P. James et al, Ser. No. 755,646, filed Aug. 27, 1968, now abandoned, for "Method and Apparatus for Applying a Strip of Rubber-Type Material about the Periphery of a Tire" is exemplary of the latter process.

Automotive vehicle wheels are of two general types, the first and probably best known being the "drop center" wheel having integral immovably fixed side flanges which engage the tire beads, employed principally for passenger vehicles which have relatively flexible tires of only several plies. The drop center or annular groove in the wheel facilitates mounting or demounting since the beads may be disposed therein and permit the beads to be peripherally stripped over one of the wheel flanges. If the tire has many plies and is relatively inflexible, such as employed on commercial vehicles, such as trucks, the drop center wheel is not employed but instead, the wheel is of split construction or is provided with a removable flange which permits mounting or demounting in an axial direction without distorting the tire over a bead flange which is necessary with the drop center wheel. Tire chucks employed in tire building or rebuilding simulate both of the types referred to and the present invention is more closely related to the latter type.

If the chuck is of the split or two-part type it will be apparent that certain hazards exist, due to human error, and human injury could occur if the chuck halves are not securely locked together when the tire is inflated, which applies lateral pressure to the side flanges which tends to axially separate same. Thus, if inflation occurs without a secure lock against axial separation, the removable half of the chuck may be blown away from the other half with sufficient force to seriously injure an operator, or other, who may be located in the path of the removable half which becomes, in effect, a deadly missile.

In the prior art it has been proposed to provide a two-part separable tire chuck with adapter or step-up rings for accommodating tires of larger incremental diameters, also exemplified by U. S. Pat. No. 3,080,899. In this construction, as practiced, the rings are of various internal diameters so that a desired combination of same may be telescoped or stacked on each other. One of the disadvantages of such construction resides in lack of provision for positively locking them to the chuck halves for preventing their undesired removal, particularly while a tire is being dismounted and the tire beads tend to stick to the rings. Also, since tire bead diameters vary by only one inch increments, this has rendered the telescopic construction somewhat fragile and subject to ring location errors.

SUMMARY OF THE INVENTION

The invention obviates the hazards just referred to by the provision of a two-part separable wheel chuck which prevents delivery of inflation air to the tire unless the two parts are securely locked against separation. Also, once locked the inflation air applies forces to a locking device which prevents it from being unlocked until the tire is deflated. Briefly, it comprises a manually operated main air supply and exhaust valve and a normally closed downstream safety valve which is moved to open position only when a manually operated device, such as a lever, has locked the movable half against separation. Separation is thus prevented until the tire has been deflated by opening the exhaust valve, which then permits the manual device to be moved to unlocked position. Thus, inflation air cannot be delivered to the tire until the movable half is locked and, after being locked, the locking device cannot be moved to unlocked position until the tire is deflated by opening the exhaust valve. While the main supply and exhaust valve are subject to being operated at any time, even erroneously or at a non-intended time, the separable part of the chuck must be locked against separation when the tire is inflated and pressurized which, of course, is the time at which the hazard exists.

The principal object of the invention, consonant with the foregoing, is to provide a two-part separable tire chuck which cannot be inadvertently separated while a tire mounted thereon is inflated under air pressure.

Another object is to provide a manually operated lock and valve system, including a safety valve, which latter cannot be opened until after the separable parts are locked against separation.

Another object is to provide a lock which cannot be manually unlocked while the tire is inflated.

Another object is to provide an exhaust valve which must be operated to deflate the tire before the lock may be manually moved to unlocked position.

Another object is to provide a separable chuck of a minimum size to receive the smallest tire of a series of tires having increasing incremental bead diameters and utilize improved adapter rings therewith which increase the minimum diameter to the bead diameter of the larger tires, the rings being constructed to be locked to the chuck, but removable to substitute other rings of different outer diameter.

Another object is to provide an adjustable chuck which will receive tires having varying transverse widths between the beads.

Further objects are to provide a construction with a minimum number of operative parts, is simplified in construction and economical of manufacture, and is fool-proof in operation, regardless of human error in its operation.

Still further objects, advantages and salient features will become more apparent from the detailed description to follow, the appended claims, and the accompanying drawing to now be briefly described.

BRIEF DESCRIPTION OF THE DRAWING

FIG. 1 diagrammatically illustrates a tire chuck and the essential valves;

FIG. 2 is a central section through the chuck of FIG. 1; and

FIG. 3 is a section taken on line 3-3, FIG. 2.

Referring now to the drawing, the subject of the invention comprises a suitable support or frame 10, which may be disposed in fixed position, as in the application referred to wherein tread material is applied and stitched to tire T, or movable as desired, depending upon the nature of other processing operations on the tire. A shaft 12 is supported for rotation in a bearing 14 and the shaft supports two members 16, 18 each of which is provided with a peripheral flange 20 which abuts a bead B of tire T. Member 16 is secured against axial movement by an abutment 21, such as a yoke, which may be selectively engaged in one of several axially spaced grooves 22 in the shaft.

The other member 18 is slidable on the shaft, and may be removed therefrom during mounting or dismounting of tire T on the members. A slidable yoke 24 is carried by member 18, the forked fingers 26 of which may engage in a shaft groove 28 or be disengaged therefrom upon sliding movement of the yoke in a direction away from the shaft. This provides a positive one position clutch or lock which prevents axial separation of member 18 away from member 16. Yoke 24 is connected to a pivoted lever 30, carried by member 18, by suitable connecting links 32. Lever 30 is shaped so that a portion thereof may be moved to an axial location of the shaft, the purpose of which will subsequently appear.

Shaft 12 is provided with a central aperture 34 which slidably receives a valve actuator rod 36, one end of which extends beyond the left end of the shaft. The other or right end of rod 36 carries a valve 38 which is normally urged against a valve seat 40 by a spring 42. The right end of aperture 34 communicates with a conventional stationary union 44 which seals against air leakage and permits the shaft to rotate relative thereto. The union communicates with an inlet valve 46 and outlet valve 48 which may be operated with separate handles or actuators, if desired. Preferably however, and as shown, a single two-position handle or actuator 50 is employed which has a central neutral position in which both valves are closed and when moved to one or the other lateral positions selectively opens one of the valves. This not only simplifies the construction but prevents opening both valves at the same time which would, of course, allow supply air to flow directly to exhaust, serving no useful purpose. The valve is of conventional construction as normally employed, for example, with air operated vehicle hoists which either deliver pressurized air for raising a ram or exhausting air to permit it to descend. While not shown, the inlet valve is connected to any desired air supply accessories, such as an adjustable pressure regulating valve, pressure gages, an air lubricator, etc.

In the operation of the construction so far described, it will be assumed that member 18 is removed from the shaft and one bead of tire T is placed on member 16 seating against its flange 20. Member 18 is then applied to the shaft and moved to the position shown, seating the other tire bead against its flange. Safety valve 38 is now closed by its spring and yoke 24 is in unlocked position. Lever 30 is then rotated which first moves the yoke to locked position with the shaft, and upon continued movement engages the left end of rod 36, moving the safety valve off of its seat. The inlet valve 46 is then opened delivering pressurized air, via conduit 52, to the space within the tire, inflating it to desired pressure. A suitable seal 54, preferably of the U-shaped or Chevron type, carried in a groove in member 16, prevents inward leakage of air between members 16, 18. The processing operation on the tire is then performed after which the exhaust valve 48 is opened, permitting the tire to deflate, after which the tire is removed from the rotatable chuck.

As will be apparent, when the tire is on the chuck and pressurized, the tire pressure produces forces which tend to axially separate members 16, 18. Abutment 21 prevents outward axial movement of member 16 and yoke 24 prevents outward axial movement of member 18. Under pressurized condition it is imperative that yoke 24 cannot be manually moved to open position which would forcibly blow member 18 outwardly and could cause serious injury to an operator or other person disposed in its path. The tendency of member 18 to separate, however, applies sufficient pressure against fingers 26 of yoke 24 to frictionally lock the yoke against an inadvertent attempt to manually move it to unlocked position, thereby preventing the hazard referred to which otherwise might occur through human error.

Other features of the invention reside in the use of only one pair of members 16, 18 upon which tires of various internal bead diameters and also axial widths across the beads, may be mounted. To adjust for the latter, abutment 21 is moved to a desired groove 22. To adjust for the former, the flanges 20 and diameters of member 16, 18, adjacent the flanges, are so chosen to receive the smallest tire of a series, which in American dimensions, increase in one inch increments. Thus, a 12 inch tire refers to a tire having an internal bead diameter of approximately 12 inches. Thirteen inch, 14 inch, 15 inch, 16 inch and larger are also in extensive use. Tires of smaller bead diameter than 12 inches are also in use but not so extensively. If very small tires were to be mounted on the chuck then, as a practical matter, members 16, 18 would probably be replaced by smaller members. As illustrated, members 16, 18 are of a diameter to receive the smallest tire presently employed extensively on passenger vehicles (12 inch). To increase the diameter beyond 12 inches a series of pairs of adapter rings are employed, each pair being used, independently of the other pairs. Referring to FIG. 2, one of the pairs 55 is illustrated which accommodate, say a 16 inch tire. These are identical and each is provided with a flange 58 and circular base portion 56, adjacent the flange, which engage a tire bead and accurately center the tire concentric with the chuck axis. Each adapter ring is provided with an inwardly extending circular rib 60 which engages a circular groove 62 in member 16 or 18. They are preferably formed of elastomeric material, such as rubber, of a size to permit stretching of same, when being applied, to seat the rib in the groove. This forms a lock which prevents lateral separation of an adapter ring from the member on which it is disposed, and particularly when the tire is being dismounted, at which time the tire bead may tend to cling to the adapter ring and carry the adapter ring with it. While only one pair of adapter rings is illustrated, it will be apparent that a plurality of pairs are employed, such as to adapt, individually, from 12 to 13 inches, 12 to 14 inches, etc.

What is claimed is:

1. In a pneumatic tire chuck of the type having a pair of conjointly rotatable members, one of which is movable away from the other to permit mounting and dismounting of a tire thereon, each member having a circular radially outwardly directed flange for engaging one of the opposite spaced beads on the tire, the tire adapted to be inflated when mounted thereon to perform a processing operation on same, the improvements in combination comprising;
   a. locking means for releasably locking the movable member at a predetermined axial position relative to the other member,
   b. an air supply valve adapted to be opened for delivering air to the tire for inflating same,
   c. an air discharge valve adapted to be opened to permit the inflated tire to be deflated,
   d. a normally closed safety valve disposed downstream and in series with the air supply valve,
   e. means associated with the locking means and safety valve for first effecting locking of the locking means and thence for opening the safety valve, whereby air may be delivered through the air supply valve and to the tire only when the locking means has been moved to locked position,
   f. the locking means adapted to be restrained from movement to unlocked position while the tire is inflated, but movable to unlocked position after the tire is deflated through the exhaust valve.

2. Apparatus in accordance with claim 1 wherein the locking means is restrained from movement to unlocked position by the pressure in the tire.

3. Apparatus in accordance with claim 2, including a rotatable shaft supporting said members, said locking means comprising a movable device carried by the movable member and engageable within a depression in the shaft, forming a positive clutch therewith.

4. Apparatus in accordance with claim 3 wherein said movable device comprises a yoke and said depression comprises groove means in the shaft for receiving the yoke.

5. Apparatus in accordance with claim 4 wherein the safety valve is disposed centrally within the shaft, and a centrally disposed actuator rod within the shaft having one end engaging the safety valve for opening same and an opposite end disposed beyond one end of the shaft adapted to be engaged for axially moving the actuator rod.

6. Apparatus in accordance with claim 5 including a manually operated lever pivotally carried by the movable member, operatively connected to the yoke and actuating rod in such manner to first move the yoke to locked position and thence engage said opposite end of the actuating rod for opening the safety valve.

7. Apparatus in accordance with claim 6 wherein said yoke and groove means are so constructed to frictionally lock the yoke to the groove means when the tire is pressurized to prevent the lever from being manually moved to its unlocked position.

8. Apparatus in accordance with claim 1 wherein each of said members is provided with a peripherally extending outer surface adjacent a flange, of a diameter to receive a tire bead thereon of a minimum desired diameter across the inner peripheral surface of the bead, a first pair of like resilient adapter rings, each being removably mounted on a member and having a flange and outer diameter for seating a tire bead of the next incremental larger inner diameter thereon, a second pair of like integral rings for seating a tire bead of the further next incremental larger inner diameter, and further like pairs for seating tire beads or other tires, the inner bead diameters of which incrementally increase, each pair of rings adapted to be separately used without the use of other pairs, an integral inwardly extending projection on each ring, and a depression in each of said peripherally extending outer surfaces for receiving a projection, for retaining a ring on a member while a tire is being dismounted from the members.

9. Apparatus in accordance with claim 8 wherein the inwardly extending projection is a circular rib and the depression is a circular groove.

10. In a pneumatic tire chuck of the type having a pair of conjointly rotatable members, one of which is movable away from the other to permit mounting and dismounting of a tire thereon, each member having a circular radially outwardly directed flange for engaging one of the opposite spaced beads on the tire, each of said members having a peripherally extending outer surface adjacent a flange of a diameter to receive a tire bead thereon of a minimum desired diameter across the inner peripheral surface of the bead, the tire adapted to be inflated when mounted thereon to perform a processing operation on same, and means for releasably locking the movable member at a predetermined axial position relative to the other member, the improvements, in combination, comprising;
   a. a first pair of like resilient adapter rings, each being removably mounted on a member and having a flange and outer diameter for seating a tire bead of the next incremental larger inner diameter thereon,
   b. a second pair of like integral rings for seating a tire bead of the further next incremental larger inner diameter,
   c. and further like pairs for seating tire beads of other tires, the inner bead diameters of which incrementally increase,
   d. each pair of rings adapted to be separately used without the use of other pairs,
   e. an integral radially inwardly extending projection on each ring, and
   f. a radially inwardly extending depression in each of said peripherally extending outer surfaces for receiving said projection, for retaining a ring on a member when a tire is dismounted from the members.

11. Apparatus in accordance with claim 10 including means for adjusting the axial spacing of the members, whereby a single pair of members and a selected pair of adapter rings may be employed to receive tires of various bead diameters, and the adjusting means may be employed to receive tire beads having varying axial spacing therebetween.

12. Apparatus for supporting an inflated tire while performing an operation on same, such as applying a strip of tread material to the periphery thereof, comprising;
   a. a rotatably mounted shaft having a central aperture extending between inboard and outboard ends of same,
   b. a first disc-like member affixed to the shaft having a peripheral flange adapted to engage one bead portion of the tire,
   c. a second disc-like member slidably mounted on the shaft having a like peripheral flange adapted to engage the other bead portion of the tire, the second member being axially removable from the outboard end of the shaft to permit mounting of the tire between said members and removing same from therebetween,
   d. a conduit communicating said central aperture with the space between said flanges for inflating the tire,
   e. a movable yoke engageable with an annular groove in the shaft for releasably locking said second member to the shaft in a predetermined position thereon;
   f. a stationary swivel air connection associated with said conduit adjacent the inboard end of the shaft adapted to permit the shaft to rotate relative to same,
   g. an upstream main air supply and exhaust valve communicating with the swivel air connection,
   h. a normally closed safety valve in said central aperture,
   i. an actuator rod disposed in said central aperture having one end engageable with said safety valve and the opposite end disposed adjacent said outboard end, and
   j. manual means for moving said yoke into locked position and thence for moving said actuating rod and safety valve to open position, the main valve adapted to be actuated thereafter to inflate the tire and also apply axial pressure on said second disc-like member and frictionally lock the yoke and prevent unlocking of same until said main valve is operated to exhaust position, whereby said second disc-like member may not be unlocked from the shaft while the tire is pressurized.

13. Apparatus in accordance with claim 12 wherein said disc-like members are of a diameter to receive a tire of minimum diameter across the beads of same, a plurality of pairs of resilient adapter rings adapted to be disposed around the disc-like members, providing flanges for engaging the beads of larger tires which increase in diameter by conventional increments, each pair being usable independently without use of other pairs, both of any of the pairs each having an annular rib thereon engageable with an annular groove in a disc-like member for locking it against lateral movement, whereby a tire may be removed from the disc-like members without disturbing the locked relation of the adapter rings therewith.

* * * * *